United States Patent

[11] 3,573,660

| [72] | Inventors | Robert V. Garver<br>Boyds;<br>Richard N. Johnson, Gaithersburg, Md. |
|---|---|---|
| [21] | Appl. No. | 819,064 |
| [22] | Filed | Apr. 24, 1969 |
| [45] | Patented | Apr. 6, 1971 |
| [73] | Assignee | The United States of America as represented by the Secretary of the Army |

[54] BROADBAND, REFLECTION-TYPE SINGLE SIDEBAND MODULATORS
6 Claims, 7 Drawing Figs.

[52] U.S. Cl. .................................................. 332/45, 325/446, 332/51, 332/52
[51] Int. Cl. .................................................. H03c 1/52
[50] Field of Search ........................................... 332/45, 5 (N), 52; 325/137, 446

[56] References Cited
UNITED STATES PATENTS

| 2,872,647 | 2/1959 | Smith ......................... | 332/45 |
| 3,233,194 | 2/1966 | Alford ......................... | 332/45 |
| 3,243,731 | 3/1966 | Erickson ..................... | 332/45X |

*Primary Examiner*—Alfred L. Brody
*Attorneys*—Harry M. Saragovitz, Edward J. Kelly, Herbert Berl and J. D. Edgerton ABSTRACT: A distributed parameter, single path, phase differential reflection circuit utilizes two nonlinear diodes to generate a single sideband signal with broadband power levels.

Patented April 6, 1971 3,573,660

SMITH CHART —
NORMALIZED
ADMITTANCE

INVENTORS
ROBERT V. GARVER
RICHARD N. JOHNSON
BY Harry M. Saragovitz, Edward J. Kelly,
Herbert Berl, & J. D. Edgerton
ATTORNEY

SMITH CHART—
NORMALIZED ADMITTANCE

SMITH CHART—
NORMALIZED IMPEDANCE

BROADBAND, REFLECTION-TYPE SINGLE SIDEBAND MODULATORS

BACKGROUND OF THE INVENTION

This invention relates to an apparatus for generating a single sideband signal that will simulate a Doppler signal in testing Doppler fuzes. Various means have been employed in the past to produce a signal displaced in frequency to simulate the Doppler effect. Some of the more commonly employed of such means have been:

1. A motor-driven, notched wheel disposed in a hollow waveguide to reflect electromagnetic wave energy displaced in frequency;
2. A diode amplitude modulator utilizing a 60 Hz phase modulator to eliminate nulls in the Doppler mixer;
3. A traveling wave tube having a sawtooth signal applied to translate the input frequency by phase modulation;
4. A single sideband modulator using two balanced mixers and power splitting and combining circuits; and
5. A circularly polarized antenna rotated to produce a continuous phase shift and frequency translation. All of the previous devices have had characteristics and limitations which made them undesirable, at least in part.

SUMMARY OF THE INVENTION

The present invention provides a single sideband modulator utilizing two nonlinear diodes which are located in a single path with the carrier source to be modulated. The diodes are driven sinusoidally and in phase quadrature to produce a total reflection coefficient which can be plotted on a conventional Smith transmission line chart as a vector of constant amplitude rotating about the center of the chart. Three embodiments presented are (1) two nonlinear resistive diodes located with a difference in electrical spacing from the carrier source to be modulated of one-eighth wavelength of the carrier frequency, (2) two nonlinear capacitive diodes located with a difference in electrical spacing of one-eighth wavelength from the carrier source, and (3) a nonlinear resistive diode and a nonlinear capacitive diode located in the same electrical plane. The reactive components of the diodes are tuned out and the bias currents of the diodes cause the diodes to be matched to the transmission line.

BRIEF DESCRIPTION OF THE DRAWINGS

FIG. 6 is a Smith chart diagram of the circuit of FIG. 5a.

DESCRIPTION OF THE PREFERRED EMBODIMENTS

Figure 1:
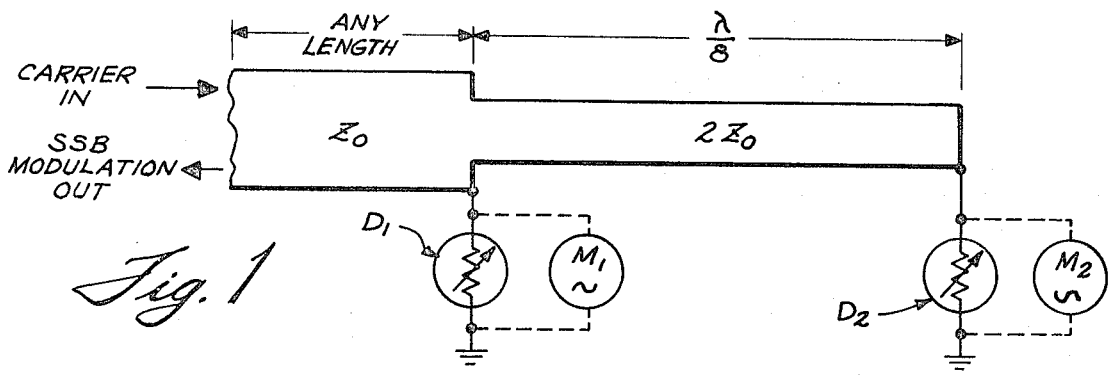
FIG. 1 is a diagrammatic view of a basic circuit utilizing two nonlinear resistance diodes.

FIG. 1 illustrates the basic operation of the circuits constructed in accordance with the invention utilizing two non-linear resistance diodes. Diodes D1 and D2 are spaced one-eighth wavelength apart along a transmission line energized by a carrier signal to be modulated. The transmission line shown is a conventional strip line construction. For purpose of illustration the center conductor is shown diagrammatically with the ground planes omitted. Diode D1 is driven by modulator M1 to impress a modulation signal thereon. Diode D2 is driven by modulator M2 to impress a modulation signal of the same frequency as modulator M1 but having a phase quadrature. The modulator circuitry is shown connected by dotted lines to simplify the drawings. Certain conventional circuit elements normally used for impedance matching and low frequency isolation purposes have been omitted since they form no part of the invention.

Figure 2:
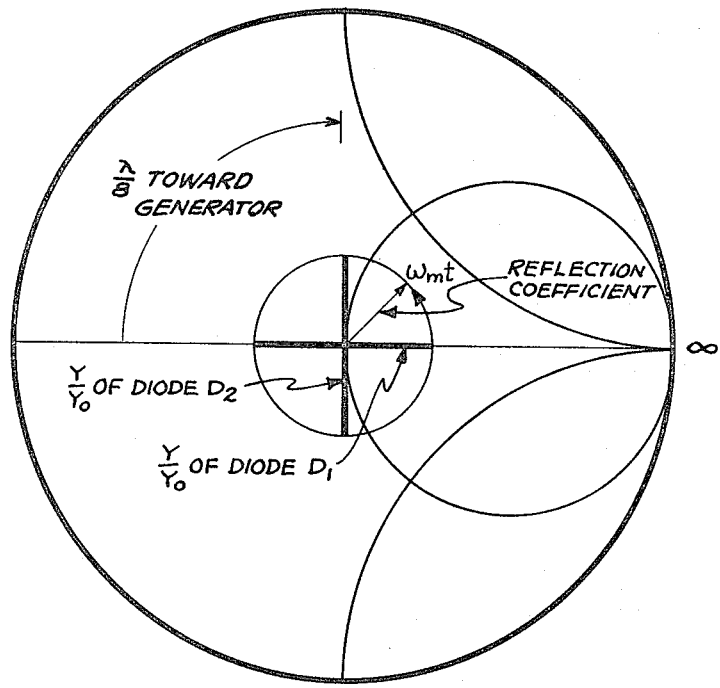
FIG. 2 is a Smith chart diagram of the circuit of FIG. 1.

The operation of the circuit of FIG. 1 will be understood more readily by referring to the Smith chart shown in FIG. 2. A nonlinear resistance diode, which has its series inductance and capacitance neutralized, has a normalized admittance which is real and a function of diode current. A bias current exists which causes the diode to be matched to the transmission line. A modulation current from modulator M1 superimposed on the bias current of diode D1 will cause the reflection coefficient of that diode to rise above zero in one phase and then go below zero in the same phase. Similarly, the modulation current superimposed on diode D2, located one-eighth wavelength further away from the carrier source at the frequency of the carrier, by modulator M2 will go to the left or right of zero as shown. The reflection coefficient of diode D2 could be considered rising above zero at $-90°$ and $+90°$. When the two diodes are driven sinusoidally and in quadrature, the total reflection coefficient is a vector of constant amplitude which rotates about the middle of the Smith chart. The output from the circuit will be $\omega_c - \omega_m$, the lower sideband.

The circuit shown is for an output in which the carrier and the upper sideband are suppressed. When carrier suppression is not important, it is not necessary that the circle have its center at the center of the Smith chart. Amplitude modulation and phase modulation will occur simultaneously and in phase quadrature. By properly adjusting the ratio between the amplitude modulation index and the phase modulation index, the upper sideband will cancel while the lower sideband will remain. This may be demonstrated as follows: Given: $V = (1 + A \cos\omega_m t) \cos [\omega_c t + B \cos (\omega_m t + \Phi)]$ then for $\Phi = 90° A$ and where the modulation indices are small, $$V = \left[\frac{A}{2} - J_1(B)\right] \cos (\omega + \omega_m)t + \left[\frac{A}{2} + J_1(B)\right] \cos (\omega_0 - \omega_m)t + (\text{an } \omega_c \text{ term})$$

by adjusting $A = 2J_1(B)$, the $\omega_c + \omega_m$ sideband becomes zero and the $\omega_c - \omega_m$ sideband remains.

It will be seen from the foregoing that the diodes do not have to be matched carefully to the center of the Smith chart when carrier suppression is not important and the modulation magnitudes can be controlled separately. The modulation properties may be made insensitive to variations in input power by using constant current sources.

Figure 3:
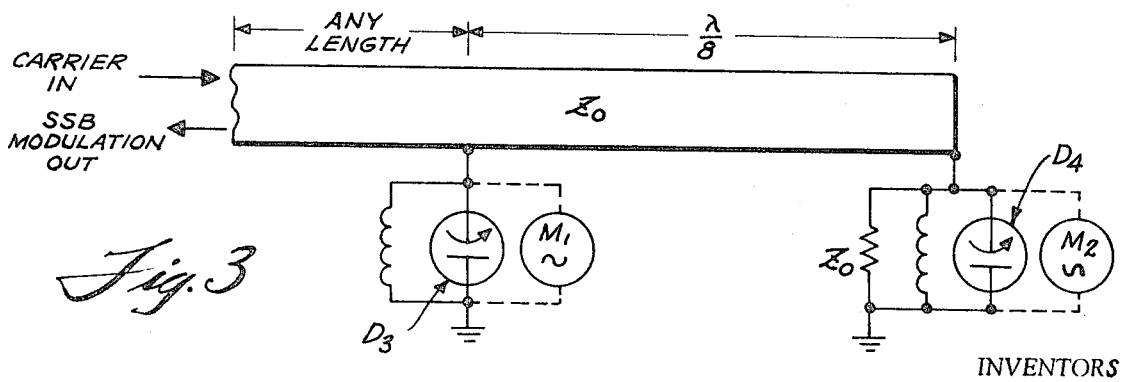
FIG. 3 is a diagrammatic view of a circuit employing two nonlinear capacitive diodes.

FIG. 3 shows a circuit in which nonlinear capacitive diodes D3 and D4 are disposed in parallel across a strip transmission line. Diode D4 is located one-eighth wavelength further from the carrier source than diode D3. In this fashion, as in the circuits shown in FIGS. 1 and 2, the carrier signal reflected back along the one-eighth wavelength transmission line section travels a total of one-fourth wavelength or 90°. The diodes are shown in parallel with inductances to illustrate a state of parallel resonance at the frequency of operation. Modulation generators M1 and M2 are shown as sinusoidal generators in phase quadrature.

Figure 4:
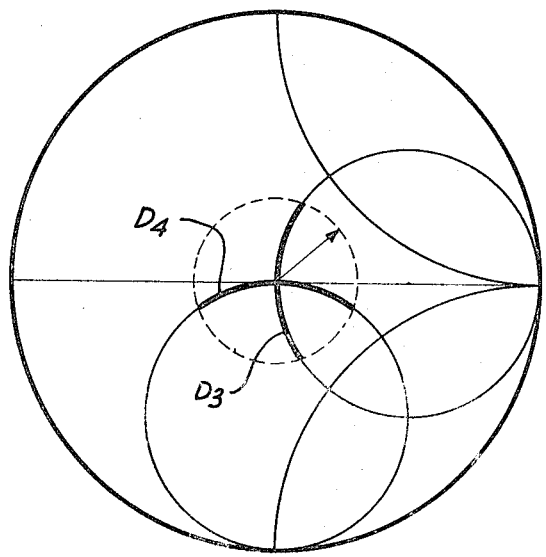
FIG. 4 is a Smith chart diagram of the circuit of FIG. 3.

The operation of the circuit of FIG. 3 is illustrated by the Smith chart of FIG. 4 showing a plot of the normalized admittances where the reflection coefficient again appears as a circle with its center at the center of the Smith chart.

Figure 5A:
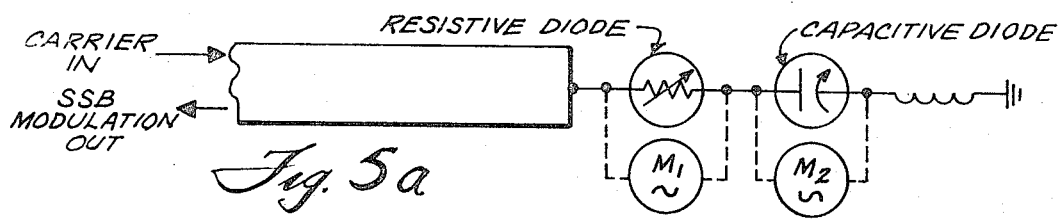
FIGS. 5a and 5b are diagrammatic views of a circuit employing one nonlinear resistive diode and one nonlinear capacitive diode in series and parallel arrangements, respectively.

FIG. 5a illustrates a circuit with a series arrangement of a resistive diode and a capacitive diode. The resistive diode and the capacitive diode are located as nearly in the same electrical plane as possible so as to be the same distance from the carrier source. Modulation generators M1 and M2 have outputs which are sinusoidal and in phase quadrature.

Figure 5B:
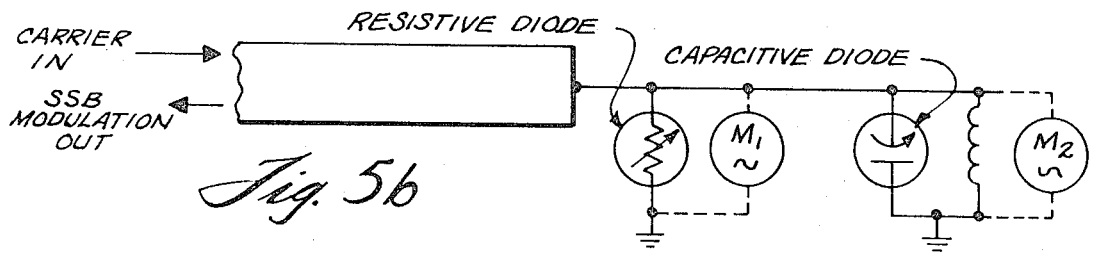

FIG. 5b shows a parallel circuit in which a resistive diode and a capacitive diode are employed. As in FIG. 5a the diodes are located as nearly in the same electrical plane as possible. An inductor is placed in parallel with the capacitive diode to achieve a resonant condition. The modulation generators are sinusoidal and in phase quadrature.

Figure 6:
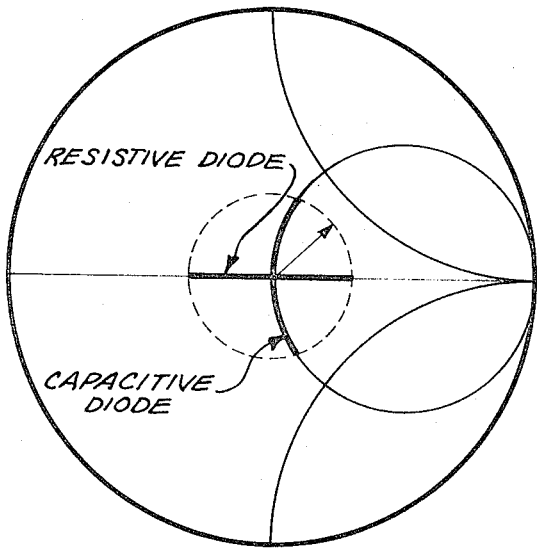

FIG. 6 shows the Smith transmission line chart diagram for the circuit of FIG. 5a with the reflection coefficient again describing a circle whose center is located at the center of the Smith chart. This particular configuration of the reflection coefficient, which is characteristic of all three embodiments shown, is present in all cases of single sideband modulation, and a modulation circuit whose reflection coefficient describes this configuration produces the desired single sideband output. When the center of the circle described by the reflection coefficient is located at the center of the Smith chart, carrier suppression occurs.

Modulators constructed in accordance with the invention are broadband, having about four times the power bandwidth of conventional modulators. A characteristic of the device is insensitivity to radio frequency power. The transmission line components of the devices have been constructed of stripline configuration, but any conventional transmission line structures may be adapted for use.

We claim:

1. A broadband single-sideband modulator comprising the combination of:
   a carrier source;
   a first nonlinear diode;
   a second nonlinear diode;
   means connecting said carrier source in an unidirectional longitudinal path, said first nonlinear diode and said second nonlinear diode being disposed in parallel along said path with respect to said carrier source;
   means for impressing sinusoidal modulation currents of the same frequency but in phase quadrature on said first and second nonlinear diodes; and
   whereby the carrier source is modulated to produce a single-sideband output signal which differs in frequency from the carrier source by the frequency of said first and second sources of modulation.

2. The combination according to claim 1 wherein, said first and second nonlinear diodes are resistive devices.

3. The combination according to claim 1 wherein, said first and second nonlinear diodes are capacitive devices.

4. The combination according to claim 1 wherein, said first nonlinear diode is a resistive device, and said second nonlinear diode is a capacitive device.

5. The combination according to claim 1 wherein, the path lengths between said carrier source and said first and second nonlinear diodes are different in electrical length by one-eighth wavelength at the frequency of the carrier source.

6. A broadband single-sideband modulator comprising the combination of:
   a carrier source;
   a first nonlinear diode;
   a second nonlinear diode;
   transmission line means connecting said carrier source in an unidirectional longitudinal path, said first nonlinear diode and said second nonlinear diode being disposed in parallel along said path with respect to said carrier source;
   the transmission line path lengths between said carrier source and said first and second nonlinear diodes being different in electrical length by one-eighth wavelength at the frequency of the carrier source;
   first means for impressing a first source of modulation on said first nonlinear diode; and
   second means for impressing a second source of modulation on said second nonlinear diode;
   said first and second sources of modulation having sinusoidal waveforms of the same frequency but in phase quadrature,
   whereby the carrier source is modulated to produce a single-sideband output signal which differs in frequency from the carrier source by the frequency of said first and second sources of modulation.